Aug. 9, 1927. 1,638,267
G. L. MOREHEAD ET AL
STEEL CONVEYER CHAIN AND LINK
Filed May 8, 1925
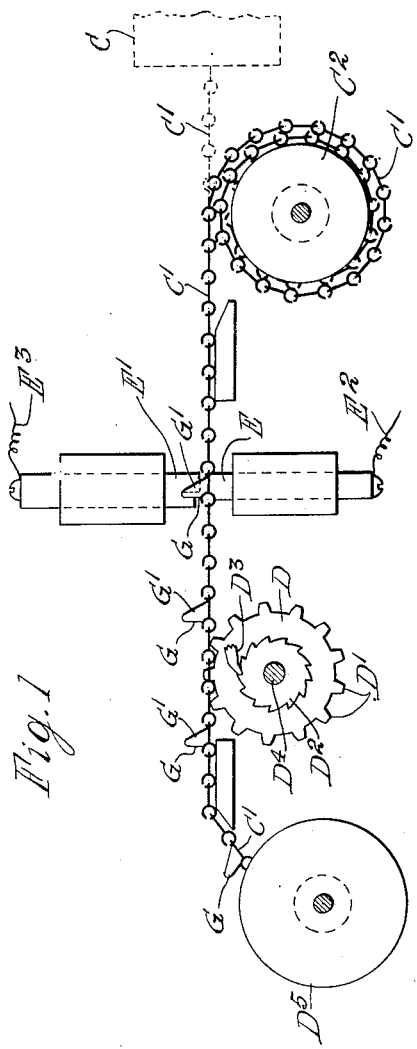
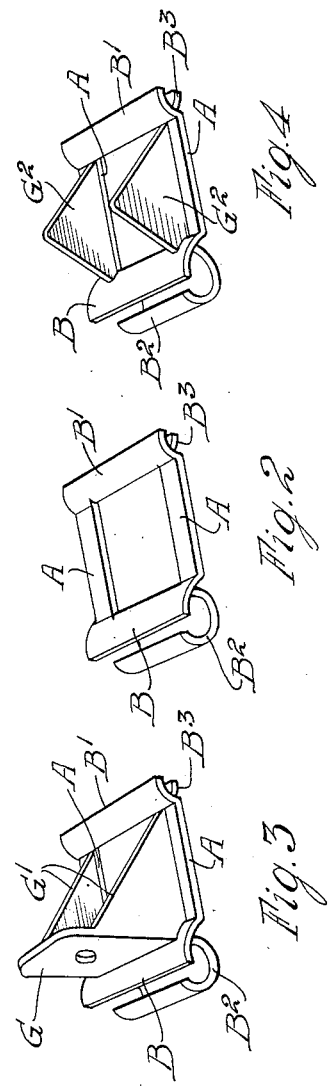
Inventors.
George L. Morehead &
Frank S. O'Neil.
by Parker & Carter
Attorneys.

Patented Aug. 9, 1927.

1,638,267

UNITED STATES PATENT OFFICE.

GEORGE L. MOREHEAD AND FRANK S. O'NEIL, OF INDIANAPOLIS, INDIANA, ASSIGNORS TO LINK-BELT COMPANY, OF CHICAGO, ILLINOIS, A CORPORATION OF ILLINOIS.

STEEL CONVEYER CHAIN AND LINK.

Application filed May 8, 1925. Serial No. 28,778.

Our invention relates to an improvement in steel chain and chain links and is applicable particularly to that type of chain wherein the individual links are formed of strip stock or from sheet metal blanks, each link being provided with a hook and pintle in part stamped out of the central aperture of the link, the hook of each link surrounding the pintle of an adjacent link. In the use of chain of this type it is frequently necessary to use links having special attachments secured thereto and one object of the present invention is to provide links adapted to carry such attachments, and to provide combined links and attachments of peculiarly efficient and easily manufactured form. Other objects will appear from time to time in the course of the specification and claims.

We illustrate our invention more or less diagrammatically in the accompanying drawings, wherein—

Figure 1 is a diagrammatic view of the manufacture of our chain;

Figure 2 is a typical plain link; and

Figures 3 and 4 are links having secured thereto special attachments in accordance with our invention.

Like parts are illustrated by like characters throughout the specification and drawings.

We illustrate a type of chain of which each link consists of the side bars A, the hook end bar B, the pintle end bar $B^1$ and the hook and pintle tongues $B^2$ $B^3$ respectively, which are punched out of the center of the link and formed into substantially the form shown in Figure 2. The hook of one link surrounds the pintle of the adjacent link. In practice a chain of this type is continuously formed, with the hook of one link positioned about the pintle of the next, the completed chain issuing continuously from the chain press diagrammatically illustrated as C. The chain press and the process of manufacture of the links form no part of the present invention and are not described in detail herein.

In our preferred type of chain and link attachments we employ attachment members which are preferably electrically welded to the individual links. In their manufacture we employ the structure and process illustrated in Figure 1. The chain $C^1$ passes continuously forward from the chain press C or may be drawn forward from a storage reel $C^2$. The chain is fed forward by a step by step movement. We illustrate herein the sprocket D with the teeth $D^1$, the ratchet wheel $D^2$, the dog $D^3$, and the drive shaft $D^4$. The chain may pass thence for example to the storage drum $D^5$.

In the course of this movement the chain passes between the upper and lower electric welding contacts or clamps E $E^1$, provided with electrical connections $E^2$ $E^3$. The particular attachment to be added to the link is welded in the normal manner by passage of current through the contacts.

Figure 2 illustrates the link before the attachment is secured to it and Figures 3 and 4 illustrate typical link attachments. Since the side bar of the link is that part which is least likely to be distorted by the pressure of the clamp $E^1$ and the electrical welding operation, and since it is the part of the link which is under least stress during the use of the chain and which is least likely to be bent, worn or distorted during use, we prefer in general to secure the attachment of the link side bars. Thus in Figure 3 the forward face G of the attachment is supported by the side members $G^1$ which are actually welded to the side bars A, whereas the member G is preferably not welded to the hook end bar B. In Figure 4 we illustrate a form of link in which upwardly triangular ears $G^2$ $G^2$ are welded to the side bars.

It will be understood that whereas we have shown a practical chain and a practical form of link that nevertheless changes may be made in the size, number, relation and disposition of parts, and in points or lines of attachment of parts, without departing from the spirit of our invention.

The use and operation of our invention are as follows:

In the use of chain of the type herein described and shown, it frequently is necessary to employ links having projections upwardly or outwardly therefrom or both for conveying or other purposes. Sometimes all of the links must be so provided, and sometimes only occasional links are spaced along the chain. Links of the type herein shown are peculiarly robust and the securing of attachments to them in no way affects the normal strength of the chain. The attachments being secured along the side bars, there is a minimum chance of weakness or distortion along the line of attachment, since side bars are not likely to be bent or distorted in use.

We claim:

1. A link comprising a pair of relatively flat side bars joined at one end by a pintle and at the other by a hook, the hook of each link surrounding the pintle of an adjacent link, the hook and pintle ends of the link projecting upwardly beyond the plane of the flat side bars, an upwardly extending sheet metal attachment member having an edge engaging the flat face of each of said side bars and welded thereto, said attachment member conforming to and extending transversely across the hook end of the link.

2. A link comprising a pair of relatively flat side bars joined at one end by a pintle and at the other by a hook, the hook of each link surrounding the pintle of an adjacent link, the hook and pintle ends of the link projecting upwardly beyond the plane of the flat side bars, an upwardly extending sheet metal attachment member having an edge engaging the flat face of each of said side bars and welded thereto, and engaging the upwardly projecting hook and pintle ends of the link.

3. A link comprising a pair of relatively flat side bars joined at one end by a pintle and at the other by a hook, the hook of each link surrounding the pintle of an adjacent link, the hook and pintle ends of the link projecting upwardly beyond the plane of the flat side bars, an upwardly extending sheet metal attachment member having an edge engaging the flat face of one of said side bars and welded thereto, and engaging the upwardly projecting hook and pintle ends of the link.

Signed at Indianapolis, Indiana, this 13 day of April 1925.

GEO. L. MOREHEAD.
FRANK S. O'NEIL.